United States Patent [19]

Rosenheck

[11] 4,296,440
[45] Oct. 20, 1981

[54] START OF MESSAGE GENERATOR FOR A FACSIMILE SYSTEM

[75] Inventor: Bernard Rosenheck, Dix Hills, N.Y.

[73] Assignee: Litton Systems, Inc., Melville, N.Y.

[21] Appl. No.: 752,757

[22] Filed: Dec. 20, 1976

[51] Int. Cl.³ .......................................... H04M 1/36
[52] U.S. Cl. ................................... 358/257; 358/264
[58] Field of Search ............... 358/256, 264, 257, 283

[56] References Cited

U.S. PATENT DOCUMENTS

| | | | |
|---|---|---|---|
| 1,756,363 | 4/1930 | Kagelmann et al. | 358/264 |
| 3,426,148 | 2/1969 | Shimabukuro | 358/264 |
| 3,950,615 | 4/1976 | Murase | 358/264 |
| 4,079,425 | 3/1978 | Vandling | 358/265 |
| 4,228,466 | 10/1980 | Vandling | 358/257 |

Primary Examiner—Robert L. Richardson
Assistant Examiner—Edward L. Coles
Attorney, Agent, or Firm—Robert F. Rotella

[57] ABSTRACT

A start of message generator for a facsimile system for selecting a specific mode of operation from any of a plurality of available modes, each of the modes having a discrete code, apparatus for encoding the selected mode with its respective code, a synchronizing word generator for generating a start of message (SOM) synchronizing word (SYNC), a clock generator for generating a selected number of clocks corresponding to the encoded selected mode, a sequencer including apparatus for enabling the synchronizing word generator for a predetermined number of clocks whereby a SOM SYNC is generated, apparatus for enabling the clock generator immediately after the SOM SYNC has been generated, whereby the selected number of clocks will be generated by the clock generator, apparatus for enabling ythe synchronizing word generator immediately after the selected number of clocks has been generated by the clock generator for a predetermined number of clocks whereby a second SOM SYNC is generated and a start of message decoder including a synchronizing word detector for detecting the first and second SOM SYNCS and counting the number of clocks therebetween and apparatus for decoding the number of clocks therebetween into one of the available modes.

2 Claims, 1 Drawing Figure

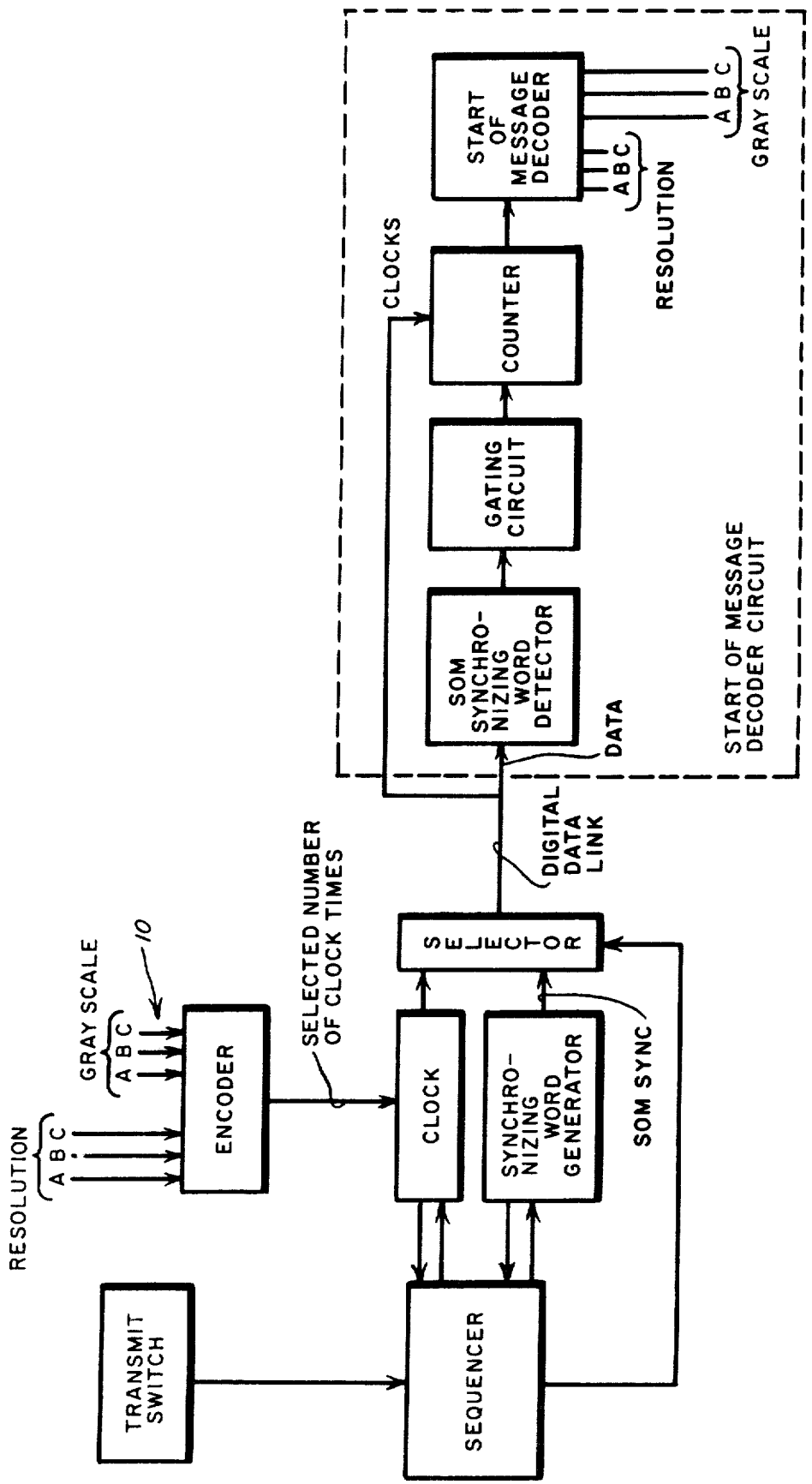

START OF MESSAGE GENERATOR FOR A FACSIMILE SYSTEM

BACKGROUND OF THE INVENTION

The present invention relates to the field of data transmission such as in facsimile systems and the like, and more particularly to the start of message which is transmitted prior to the transmission of scan lines to identify the mode of operation of the facsimile system.

Previously, a SOM SYNC was transmitted followed by an operation mode code to identify which one of a plurality of available operation modes was to be utilized. Bit errors in the received data stream can modify the received code word and this is undesirable.

BRIEF SUMMARY OF THE INVENTION

It is an object of the present invention to provide a means for transmitting the mode code which will not be prone to such errors.

Other objects and advantages of the present invention will become apparent from the following portion of this specification and from the accompanying drawing which illustrates in accordance with the mandate of the patent statutes, a presently preferred embodiment incorporating the principles of the invention.

BRIEF DESCRIPTION OF THE DRAWING

The sole drawing is a block diagram of a start of message generator configured in accordance with the teachings of the present invention.

DETAILED DESCRIPTION OF THE INVENTION

Referring to the sole drawing, an operator presses one of a plurality of buttons 10 which correspond to the desired mode of transmission such as choice of resolution or grey scale. This selected mode is coded by an encoder to have a selected number of clock times or data spaces. When the operator closes the transmit switch, the sequencer is enabled. The sequencer then enables the synchronizing word generator and a SOM SYNC is transmitted via a selector to a start of message decoder circuit. Immediately following the generation of the SOM SYNC, the sequencer enables the clock generator and the selected number of data spaces corresponding to the selected mode of transmission is generated and directed via the selector to the start of message decoder circuit. It is irrelevant as to what digits are sent with the data spaces. Conveniently, all zeros or all ones can be sent. Immediately thereafter, the sequencer again enables the synchronizing code generator and a second SOM SYNC is transmitted to the start of message decoder circuit. The SOM SYNCS are highly immune to data errors.

A SOM synchronizing word detector detects the first and second SOM SYNCS and the gating circuit permits the counters to count the clocks (clock times or data spaces) between the two SOM SYNCS. This count is decoded by a SOM decoder to identify the selected mode of operation. A synchronizing code is conventionally designed to be highly immuned to noise spikes.

Since only the clocks generated by the clock generator determine the mode of transmission, the detected count will not be affected by errors in the received data system which would effect only the irrelevant data and not the clock.

What is claimed is:

1. A start of message generator including means for providing a substantial immunity to transmission line noise for a facsimile system comprising
    means for selecting a specific mode of operation from any of a plurality of available modes, each of said modes having a discrete code,
    means for encoding the selected mode with its respective code,
    synchronizing word generator means for generating a start of message synchronizing word,
    clock generator means for generating a selected number of clocks corresponding to the encoded selected mode,
    sequencer means including
        means for enabling said synchronizing word generator means for generating the start of message synchronizing word,
        means for enabling said clock generator means immediately after said start of message synchronizing word has been generated for generating the selected number of clocks corresponding to the encoded selected mode,
        means for enabling said synchronizing word generator means immediately after said selected number of clocks has been generated by said clock generator means for generating a second start of message synchronizing word, and
    start of message decoder means including
        start of message synchronizing word detector means for detecting the first and second start of message synchronizing words,
        means for counting clocks,
        means for enabling said counting means during the interval between the first and second start of message synchronizing words, and
        means for decoding said number of counted clocks into one of said available modes.

2. A method of defining the mode of data processing in a data transmission system wherein data can be processed in a plurality of modes comprising
    transmitting first and second spaced start of message synchronizing words,
    defining the spacing between the first and second start of message synchronizing codes to be a predetermined number of clock intervals corresponding to the desired mode of data processing,
    receiving the first and second start synchronizing codes and counting the number of clock intervals therebetween, and
    identifying the desired mode of data processing corresponding to the counted number of clock intervals.

* * * * *